(12) United States Patent
Ke (10) Patent No.: US 7,730,127 B2
(45) Date of Patent: Jun. 1, 2010

(54) METHOD, SYSTEM AND APPARATUS FOR VIDEO SHARING

(75) Inventor: Shanyang Ke, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 167 days.

(21) Appl. No.: 12/140,625

(22) Filed: Jun. 17, 2008

(65) Prior Publication Data
US 2008/0250466 A1    Oct. 9, 2008

Related U.S. Application Data

(63) Continuation of application No. PCT/CN2007/003390, filed on Nov. 30, 2007.

(30) Foreign Application Priority Data

Dec. 1, 2006   (CN)   ................ 2006 1 0161007

(51) Int. Cl.
*G06F 15/16* (2006.01)
(52) U.S. Cl. ............... 709/203; 709/213; 709/219; 709/227; 725/37; 725/62; 725/74; 725/86; 725/99; 725/105; 725/135; 725/143
(58) Field of Classification Search .......... 709/203, 709/213, 219, 227; 725/37, 62, 74, 86, 99, 725/105, 135, 143
See application file for complete search history.

(56) References Cited

U.S. PATENT DOCUMENTS

| | | | |
|---|---|---|---|
| 6,934,756 B2 * | 8/2005 | Maes | 709/227 |
| 7,529,675 B2 * | 5/2009 | Maes | 704/270.1 |
| 2004/0103157 A1 * | 5/2004 | Requena et al. | 709/206 |
| 2005/0060411 A1 * | 3/2005 | Coulombe et al. | 709/227 |
| 2005/0198193 A1 * | 9/2005 | Halme | 709/217 |
| 2005/0198304 A1 * | 9/2005 | Oliver et al. | 709/227 |
| 2006/0036741 A1 * | 2/2006 | Kiss et al. | 709/227 |
| 2006/0129638 A1 * | 6/2006 | Deakin | 709/203 |
| 2006/0149811 A1 * | 7/2006 | Bennett et al. | 709/203 |

(Continued)

FOREIGN PATENT DOCUMENTS

CN    1808996    7/2006

OTHER PUBLICATIONS

"IMS Registration Trigger".. 3GPP TSG SA WG2 Architecture—S2#48, vol. S2-052159, No. 48. Sep. 2008, Sophia Antipolis, France. <<http://www.3gpp.org/ftp/tsg_sa/WG2_Arch/TSGS2_48_Sophia_Antipolis/Docs/S2-052159.zip>>. Last Accessed Oct. 21, 2008.

*Primary Examiner*—Michael Won
(74) *Attorney, Agent, or Firm*—Darby & Darby P.C.

(57) ABSTRACT

A method for video sharing, which realizes video sharing between an originating UE and a terminating UE when the terminating UE is not IMS core network registered. The method includes the following steps: an originating UE sends a video sharing request containing a URI of callee to an application server; the application server determines that the terminating UE of the callee is not IMS core network registered and notifies the terminating UE to register; the terminating UE activates a GPRS connection and registers with the IMS core network; the originating UE and the registered terminating UE set up a sharing session via the application server; the originating UE and the terminating UE share video information. A system and apparatus for practicing this method is also disclosed.

16 Claims, 9 Drawing Sheets

U.S. PATENT DOCUMENTS

| | | | |
|---|---|---|---|
| 2006/0212511 A1* | 9/2006 | Garcia-Martin | 709/203 |
| 2007/0022200 A1* | 1/2007 | Benkert et al. | 709/227 |
| 2007/0055783 A1* | 3/2007 | Gourraud | 709/227 |
| 2008/0046578 A1* | 2/2008 | van der Gaast | 709/229 |
| 2008/0064398 A1 | 3/2008 | Zhu | |
| 2008/0212569 A1* | 9/2008 | Terrill et al. | 370/352 |
| 2009/0144429 A1* | 6/2009 | Astrom | 709/227 |

* cited by examiner

METHOD, SYSTEM AND APPARATUS FOR VIDEO SHARING

CROSS REFERENCE TO RELATED APPLICATIONS

This application is a continuation of PCT/CN2007/003390 filed on Nov. 30, 2007, and claims the benefit of Chinese Patent Application No. 200610161007.7 filed on Dec. 1, 2006, both of which are incorporated by reference in their entireties herein.

FIELD OF THE INVENTION

The present invention relates to communication technologies and particularly to a method, system, and apparatus for video sharing.

BACKGROUND OF THE INVENTION

With the development of mobile communication technologies, people are no longer satisfied with a communication mode of only voice communication. They require a brand-new multimedia communication. The multimedia communication is more than simple audio and video communication, but incorporates instant messaging, collaborative work, and streaming media, especially the convergence of new communication with traditional voice communication. According to the trend of Internet and telecom network convergence, standardization organizations have proposed the concept of next generation networks. The Third Generation Partnership Project (3GPP) introduces an IP multimedia subsystem (IMS) core network with all Internet Protocol (IP) service network architecture on the basis of a packet bearer network. The purpose of the IMS is to control the openness of service capabilities regardless of user access modes and to provide multimedia communication experience according to personalized user data. Video sharing means one user equipment (UE) shares local video information with other one or more UE. The video information for sharing includes video clips taken by a camera, local video files, images, music clips and flashes.

The signaling control of video sharing is based on the Session Initiation Protocol (SIP). Before an originating user equipment (UE) can share video information with a terminating UE, the originating UE and the terminating UE must register with the IMS core network. Video sharing may be between a broadband mobile network and a non-broadband mobile network, or between two non-broadband mobile networks. Broadband mobile networks include networks compliant with 3GPP R5 or later 3GPP releases, in which the calls are carried over IP. Non-broadband mobile networks include networks compliant with the 2.5 Generation (2.5G), 3GPP R99, and 3GPP R4, in which basic calls are carried over the circuit switched (CS) domain and data services are carried over the general packet radio service (GPRS) system.

Figure 1:
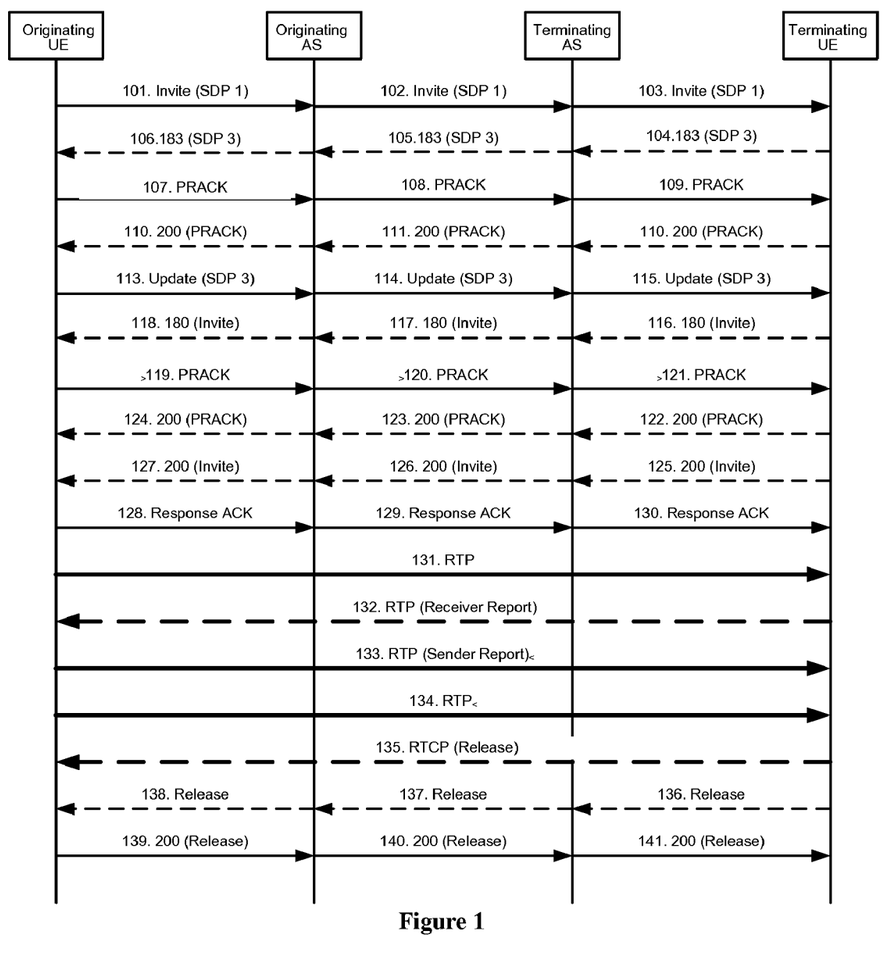
FIG. 1 shows a signaling flow for video sharing between an originating UE in a broadband mobile network and a terminating UE in a non-broadband mobile network in the prior art.

FIG. 1 shows a conventional method for video sharing where the originating UE is a UE in a broadband mobile network and the terminating UE is a UE in a non-broadband mobile network. The originating UE communicates with a originating application server (AS) via an originating IMS core network. The originating AS communicates with a terminating AS via the originating IMS core network and a terminating IMS core network. The terminating AS communicates with the terminating UE via the terminating IMS core network. For the purpose of description, the method below only deal with the originating UE, the originating AS, the terminating AS and the terminating UE.

As shown in FIG. 1, the method for video sharing includes the following steps:

Steps 101-106: The originating UE and the terminating UE perform media negotiation on the basis of SIP.

Specifically, the originating UE sends a video sharing invitation to the terminating UE via the originating AS and the terminating AS; the terminating UE sends the media negotiation result to the originating UE via the terminating AS and the originating AS.

Steps 107-130: The originating UE and the terminating UE establish provisional communication.

Specifically, the process includes: the originating UE sends a Provisional Response Acknowledgement (PRACK) to the terminating UE via the originating AS and the terminating AS; the terminating UE sends an acknowledgement to the originating UE via the terminating AS and the originating AS; the originating UE sends an UPDATE to the terminating UE via the originating AS and the terminating AS; the terminating UE sends an ALERT to the originating UE via the terminating AS and the originating AS; the originating UE sends a PRACK to the terminating UE via the originating AS and the terminating AS; the terminating UE sends an acknowledgement to the originating UE via the terminating AS and the originating AS; the terminating UE sends a video sharing acknowledgement to the originating UE via the terminating AS and the originating AS; the originating UE sends a response acknowledgement to the terminating UE via the originating AS and the terminating AS.

Steps 131-134: The originating UE and terminating UE establish a Real-Time Transport Protocol (RTP) link and share video information.

Specifically, the process includes: the originating UE establishes an RTP link with the terminating UE; the terminating UE sends a receiver report to the originating UE; the originating UE sends a sender report to the terminating UE; the originating UE shares video information with the terminating UE over the RTP link.

Steps 135-141: The terminating UE terminates the video sharing, the originating UE and terminating UE release the communication link, and the video sharing ends.

Specifically, the terminating UE sends an RTP LINK RELEASE message to the originating UE; the terminating UE sends a RELEASE message to the originating UE via the terminating AS and the originating AS; the originating UE sends a RELEASE ACK to the terminating UE via the originating AS and the terminating AS.

In the prior art shown in FIG. 1, the UE in a non-broadband mobile network needs to activate a GPRS connection after power-on and register with the IMS core network, and the UE in a broadband mobile network registers with the IMS core network automatically after power-on. Before a UE in any network registers with the IMS core network, the UE is unable to share video information with UEs in other networks. After successful registration, the UEs establish a connection and perform media negotiation over SIP and transfer the shared media according to the negotiation result.

If the terminating UE is in a non-broadband mobile network, its GPRS connection is normally inactive and the control signaling of the originating UE in a broadband mobile network cannot be routed correctly to the terminating UE. To ensure correct routing of control signaling, the UE in the non-broadband mobile network must be always GPRS activated and IMS core network registered. This will consume a large quantity of resources in the PS domain. Besides, to keep the GPRS connection active increases the energy consumption of the UE and shortens its standby time.

Figure 2:
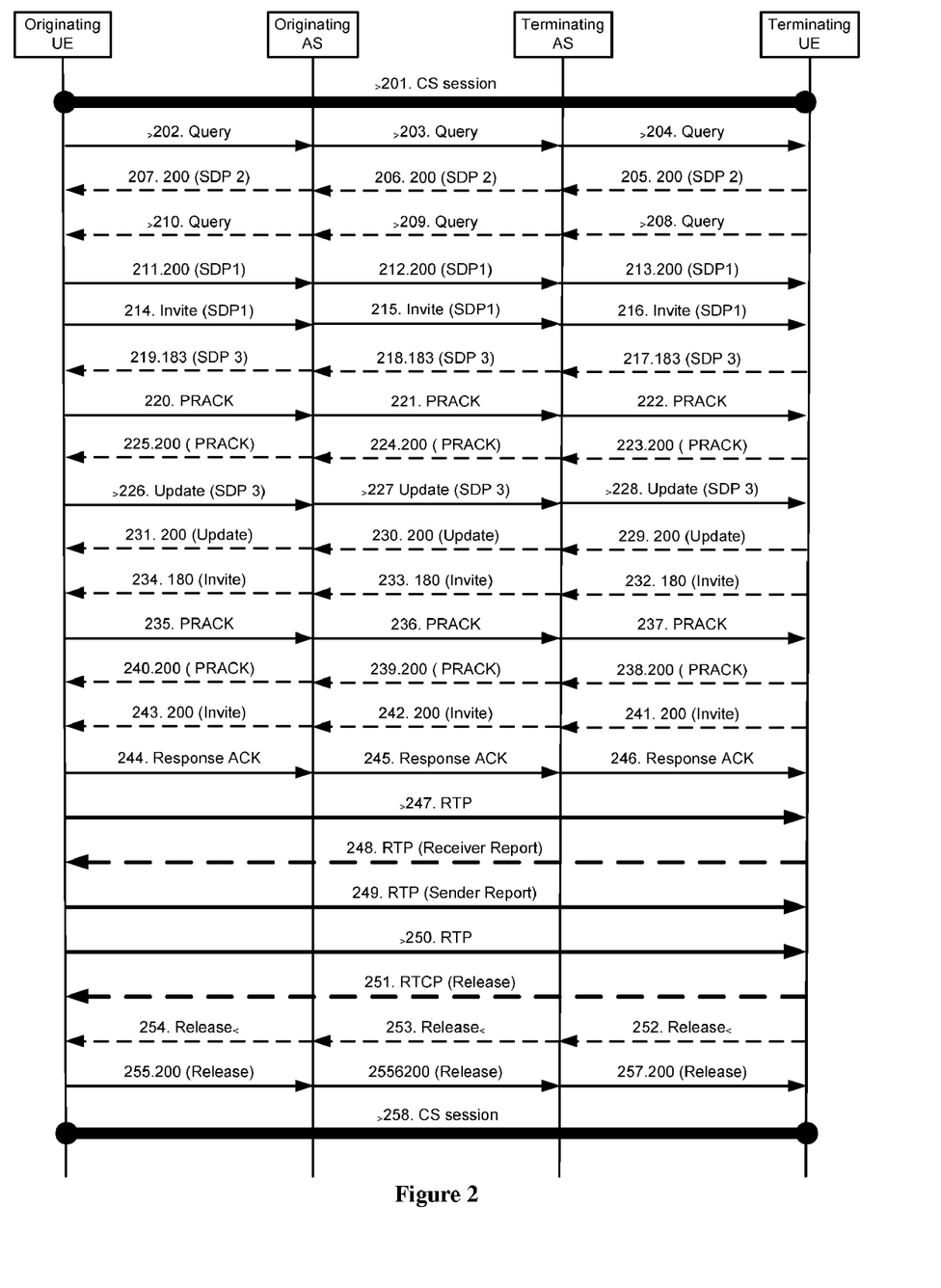
FIG. 2 shows a signaling flow for video sharing between two UEs in a non-broadband network in the prior art.

FIG. 2 illustrates a method in the prior art for implementing video sharing between two UEs in a non-broadband network. The originating UE communicates with the originating AS via the originating IMS core network. The originating AS communicates with the terminating AS via the originating IMS core network and the terminating IMS core network. The terminating AS communicates with the terminating UE via the terminating IMS core network. For the purpose of description, the method below only deals with the originating UE, the originating AS, the terminating AS and the terminating UE. According to FIG. 2, the method includes the following steps:

Step 201: The originating UE and the terminating UE establish a voice connection.

Steps 202-213: The originating UE and the terminating UE query whether the other party is capable of video sharing.

Specifically, the process includes: the originating UE sends a QUERY message to the terminating UE via the originating AS and the terminating AS; the terminating UE sends a QUERY ACK to the originating UE via the terminating AS and the originating AS; the terminating UE sends a QUERY message to the originating UE via the terminating AS and the originating AS; the originating UE sends a QUERY ACK_200 to the terminating UE via the originating AS and the terminating AS.

Steps 214-219: The originating UE and the terminating UE perform media negotiation on the basis of SIP.

Specifically, the process includes: the originating UE sends a video sharing request to the terminating UE via the originating AS and the terminating AS; the terminating UE sends the media negotiation result to the originating UE via the terminating AS and the originating AS.

Steps 220-246: The originating UE and the terminating UE establish provisional communication.

Specifically, the process includes: the originating UE sends a PRACK to the terminating UE via the originating AS and the terminating AS; the terminating UE sends an acknowledgement to the originating UE via the terminating AS and the originating AS; the originating UE sends an UPDATE to the terminating UE via the originating AS and the terminating AS; the terminating UE sends an ALERT to the originating UE via the terminating AS and the originating AS; the originating UE sends a PRACK to the terminating UE via the originating AS and the terminating AS; the terminating UE sends an acknowledgement to the originating UE via the terminating AS and the originating AS; the terminating UE sends a video sharing request acknowledgement to the originating UE via the terminating AS and the originating AS; the originating UE sends a response acknowledgement to the terminating UE via the originating AS and the terminating AS.

Steps 247-250: The originating UE and the terminating UE establish an RTP link and share video information over the link.

Specifically, the process includes: the originating UE establishes an RTP link with the terminating UE; the terminating UE sends a receiver report to the originating UE; the originating UE sends a sender report to the terminating UE; the originating UE shares video information with the terminating UE via the RTP link.

Steps 251-257: The terminating UE terminates the video sharing, the originating and terminating UEs release the communication link, and the video sharing ends.

Specifically, the process includes: the terminating UE sends an RTP LINK RELEASE message to the originating UE; the terminating UE sends a RELEASE message to the originating UE via the terminating AS and the originating AS; the originating UE sends a RELEASE ACK to the terminating UE via the originating AS and the terminating AS.

Step 258: The originating UE and the terminating UE restore the voice connection in the CS domain.

In the prior art shown in FIG. 2, the originating UE and the terminating UE first establish a voice connection in the CS domain. Both the originating UE and the terminating UE automatically activate the GPRS connection and register with the IMS core network so that video information can be shared between them.

Because the terminating UE does not need to be always GPRS activated and IMS core network registered, the terminating UE achieves lower energy consumption and uses fewer PS domain resources. Nevertheless, the method is subject to certain deficiencies. First, a voice connection must be established in the CS domain before video sharing. This causes certain restrictions to video sharing. Users may give up sharing due to the cost of the voice call. Second, most users establish voice connections for calls, and not for video sharing. When a GPRS connection is activated and registration is performed in the IMS core network for each voice call, there will be a waste of GPRS resources. Third, no matter whether the originating UE and terminating UE are IMS core network registered, video sharing is impossible without an established voice connection.

SUMMARY OF THE INVENTION

The invention discloses a method, system and apparatus for video sharing, which solves the inability in the prior art to implement video sharing without an established voice connection between the originating UE and the terminating UE.

One embodiment of the invention provides a method for video sharing, including the steps of:

sending, by an originating UE, a video sharing request containing a Uniform Resource Identifier (URI) of callee to an AS;

determining, by the AS, that a terminating UE of the callee is not IMS core network registered and notifying the terminating UE to register, and, activating, by the terminating UE, a GPRS connection and registering, by the terminating UE, with the IMS core network; and sharing, by the originating UE, video information with the terminating UE.

Another embodiment of the invention provides a system for video sharing. The system includes:

an IMS core network, adapted to forward messages exchanged between a UE and an AS and provide a video sharing service after the originating UE and the terminating UE are registered;

an AS, adapted to receive a video sharing request containing a URI of callee from the originating UE and notify the terminating UE to register if it determines that the terminating UE is not IMS core network registered;

an originating UE, adapted to send the video sharing request containing the URI of callee to the AS and set up a sharing session with a terminating UE after the terminating UE is registered; and a terminating UE, adapted to activate a GPRS connection and register with the IMS core network if it is not IMS core network registered after receiving the video sharing request.

Another embodiment of the invention provides a method for video sharing, including the steps of:

notifying, by an AS, a terminating UE to register if the AS determines that the terminating UE is not IMS core network registered after receiving a video sharing request containing the URI of callee; and providing, by the AS, the video sharing service for originating and terminating UEs, after the terminating UE activates its GPRS connection and registers with the IMS core network and the originating UE and the registered terminating UE set up a sharing session via the AS.

The AS provided in the embodiment of the invention includes:

a registration determining unit, adapted to determine whether the terminating UE is IMS core network registered after the URI of callee contained in the video sharing request is authenticated;

a registration notifying unit, adapted to notify the terminating UE via a short message to register with the IMS core network after the registration determining unit determines that the terminating UE is not IMS core network registered;

a video sharing requesting unit, adapted to send a video sharing request to the terminating UE after the registration determining unit determines that the terminating UE is IMS core network registered.

With the method, system and apparatus provided in some embodiments of the invention, independent video sharing sessions can be set up between UEs. The UEs are no longer forced to establish voice connections for the purpose of video sharing. The terminating UE activates its GPRS connection and registers with the IMS core network after it receives a registration notification from the terminating AS. This reduces the useless consumption of GPRS resources. In some embodiments of the invention, when the originating UE intends to share video information, it sends a video sharing request that contains the URI of callee to an AS. After the AS determines that the terminating UE is not registered in the terminating IMS core network, it notifies the terminating UE to register. The terminating UE activates a GPRS connection and registers with the terminating IMS core network. The registered terminating UE shares video information with the originating UE. Thus, the video sharing service is implemented.

BRIEF DESCRIPTION OF THE DRAWINGS

The invention will become more readily apparent from the Detailed Description of the Invention, which proceeds with reference to the drawings, in which.

DETAILED DESCRIPTION OF THE INVENTION

In an embodiment of the invention, to realize video sharing between UEs, an AS operates in the mobile network to notify the terminating UE to register with the IMS core network, for example, by sending a short message to the terminating UE. After the terminating UE is registered, video information is shared between the originating UE and the terminating UE.

The invention is hereinafter described in detail with reference to the described embodiments and accompanying drawings.

Figure 3:
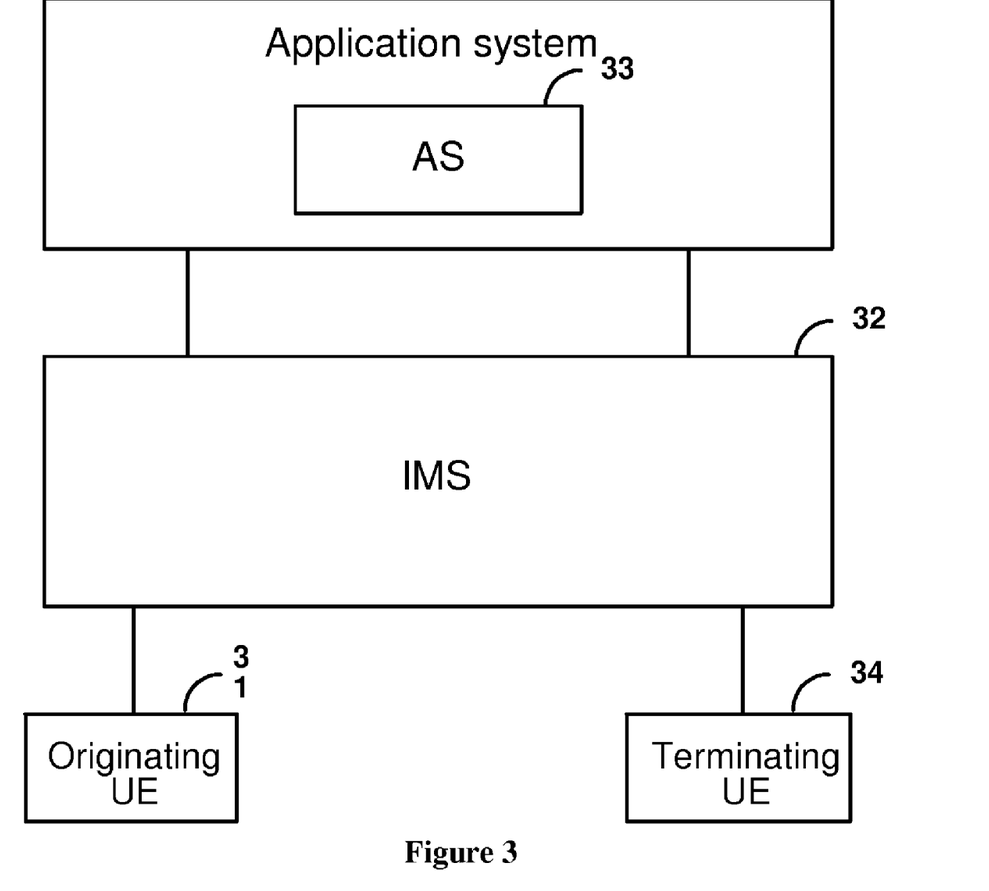
FIG. 3 shows a schematic diagram of a system for video sharing according to one embodiment of the invention.

As shown in FIG. 3, an embodiment of the invention discloses a system for video sharing, which includes an originating UE 31, an IMS core network 32, an AS 33 and a terminating UE 34.

The IMS core network 32 couples with several UEs, configured to forward messages exchanged between the UEs and the AS 33 and to provide the video sharing service after the originating UE 31 and the terminating UE 34 are registered.

The AS 33 is incorporated in the application system (i.e., the service system providing network services in the home network of the caller or callee). After it receives a video sharing request containing the URI of callee from the originating UE 31, if it determines that the terminating UE 34 of the callee is not registered in the terminating IMS core network, it notifies the terminating UE 34 to register.

The originating UE 31 is configured to send a video sharing request containing the URI of callee to the AS 33.

The terminating UE 34 is configured to activate a GPRS connection and register with the terminating IMS core network if it is not registered after it receives the video sharing request.

Figure 4:
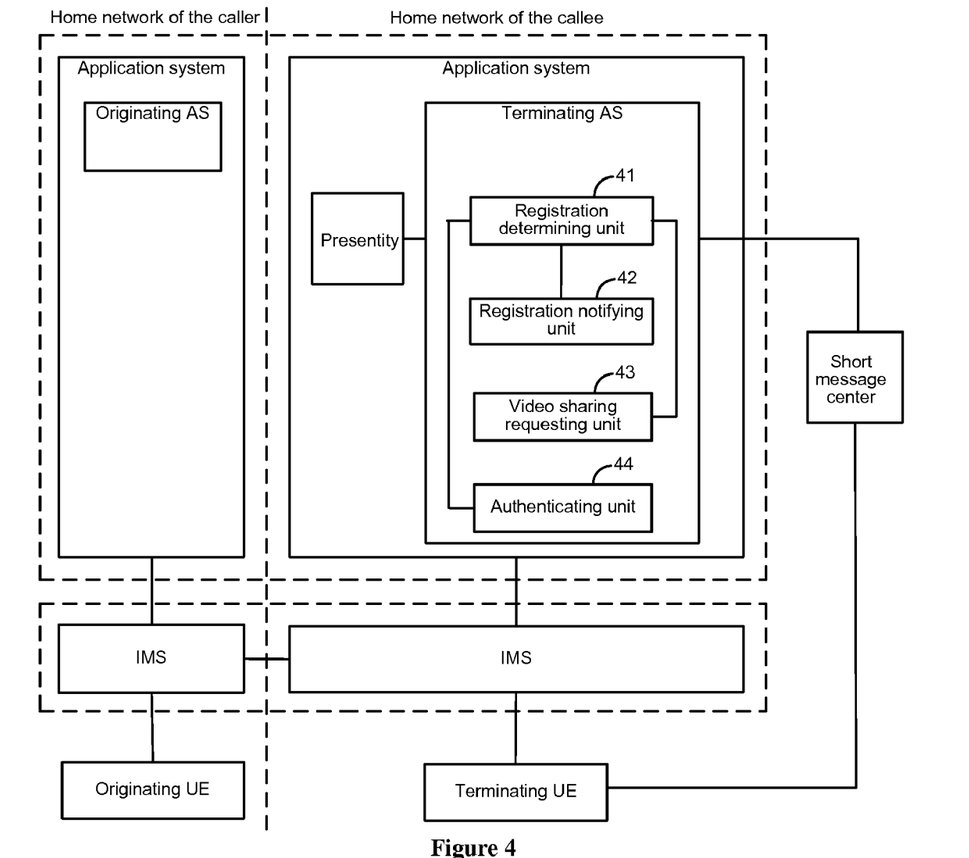
FIG. 4 shows a schematic diagram of a system for video sharing according to another embodiment of the invention.

As shown in FIG. 4, if the originating UE 31 and the terminating UE 34 have different home networks, the AS includes an originating AS 33 and a terminating AS 38, and the IMS core network includes an originating IMS core network 32 and a terminating IMS core network 36. After receiving a video sharing request containing the URI of callee from the originating UE 31, the originating IMS core network 32 sends the request to the originating AS 33. The originating AS 33 authenticates the originating UE 31. If the authentication is successful, the originating AS 33 sends the video sharing request to the originating IMS core network 32. The originating IMS core network 32 sends the video sharing request to the terminating IMS core network 36. The terminating IMS core network 36 sends the video sharing request to the terminating AS 38.

The terminating AS 38 determines whether the terminating UE 34 is registered in the terminating IMS core network 36. If not, the terminating AS 38 notifies the terminating UE 34 to register with the terminating IMS core network 36. The terminating UE 34 activates its GPRS connection and registers with the terminating IMS core network 36. If the terminating AS 38 determines that the terminating UE 34 is registered in the terminating IMS core network 36, the terminating AS 38 forwards the video sharing request from the originating UE 31 to the terminating UE 34. The terminating AS 38 determines whether it has received a video sharing permit notification from the terminating UE 34. If it has received the video sharing permit notification, the terminating AS 38 sends the permit notification to the originating AS 33 via the terminating IMS core network 36 and the originating IMS core network 32. The originating AS 33 sends the video sharing permit notification to the originating UE 31 via the originating IMS core network 32. The originating UE 31 and the terminating UE 34 share video information. If it has not received the video sharing permit notification, the terminating AS 38 sends a video sharing denial notification to the originating AS 33 via the terminating IMS core network 36 and the originating IMS core network 32, and the originating AS 33 sends the denial notification to the originating UE 31 via the originating IMS core network 32.

The terminating AS 38 includes: a registration determining unit 41, a registration notifying unit 42 and a video sharing requesting unit 43.

The registration determining unit 41 determines whether the terminating UE 34 is registered in the terminating IMS core network 36 after the URI of callee contained in the video sharing request is authenticated. If the registration determining unit 41 determines that the terminating UE 34 is not registered, the registration notifying unit 42 queries a MSISDN (Mobile Station International ISDN Number) of the terminating UE 34 from the terminating IMS core network 36 according to the URI of callee contained in the video sharing request, and sends a notification to the terminating UE 34 according to the MSISDN, requesting the terminating UE 34 to register with the terminating IMS core network 36. The video sharing requesting unit 43 sends the video sharing request to the terminating UE 34 after the registration determining unit 41 determines that the terminating UE 34 is registered in the terminating IMS core network 36.

The terminating AS 38 further includes an authenticating unit 44, configured to authenticate the URI of callee contained in the video sharing request and to send the authentication result to the registration determining unit 41.

Figure 5:
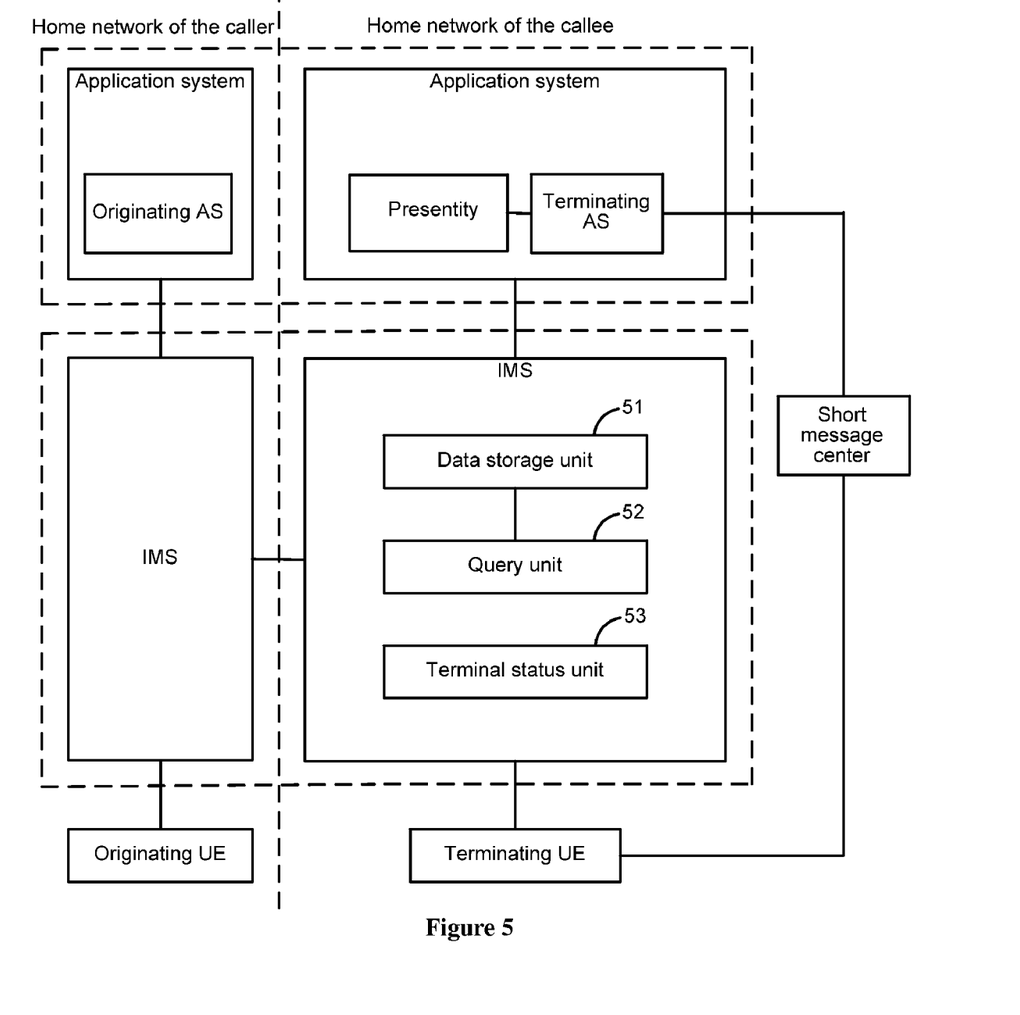
FIG. 5 shows a schematic diagram of a system for video sharing according to another embodiment of the invention.

As shown in FIG. 5, the terminating IMS core network 36 includes a data storage unit 51, a query unit 52 and a terminal status unit 53. The data storage unit 51 stores the mapping between URIs of callee and MSISDNs. The query unit 52 obtains the MSISDN corresponding to the URI of callee from the mapping stored by the data storage unit 51. The terminal status unit 53 sends a third party registration request to a presentity, after it receives the registration request from the terminating UE 34. The registration notifying unit 42 of FIG. 4 may send a query notification to the query unit 52 of FIG. 5. The query notification includes the URI of callee contained in the video sharing request.

The system may further include a presentity 39 to store the presence information of the terminating UE 34 in the terminating IMS core network 36. In this case, the registration determining unit 41 can determine whether the terminating UE 34 is registered in the terminating IMS core network according to the presence information stored in the presentity 39.

In response to the registration determining unit 41 determining that the terminating UE 34 is registered in the terminating IMS core network 36 according to the presence information, the video sharing requesting unit 43 sends a video sharing request to the terminating UE 34. In response to the registration determining unit 41 determining that the terminating UE 34 is not registered in the terminating IMS core network 36 according to the presence information, the registration notifying unit 42 obtains the MSISDN of the terminating UE 34 from the terminating IMS core network 36 according to a caller user identifier contained in the video sharing request. If the registration notifying unit 42 fails to obtain the MSISDN of the terminating UE 34 from the terminating IMS core network 36, the registration notifying unit 42 notifies the originating AS 33 via the terminating IMS core network 36 and the originating IMS core network 32 that the terminating UE 34 is inaccessible. The originating AS 33 notifies the originating UE 31 via the originating IMS core network 32 that the terminating UE 34 is inaccessible.

In addition, the system may further include a short message center 37. In response to the registration determining unit 41 determining that the terminating UE 34 is not registered in the terminating IMS core network 36, the registration notifying unit 42 sends a short message that contains a service identifier as trigger signaling to the short message center 37, according to the MSISDN obtained from the terminating IMS core network 36. In response to receiving the short message, the short message center 37 sends the short message to the terminating UE 34, notifying the terminating UE 34 to register with the terminating IMS core network 36.

In response to receiving the short message, the terminating UE 34 activates its GPRS connection and registers with the terminating IMS core network 36 according to the service identifier contained in the short message. In response to receiving the registration request from the terminating UE 34, the terminal status unit 53 sends a third party registration request to the presentity 39. When the terminating UE 34 successfully registers with the terminating IMS core network 36, the terminal status unit 53 sends a callee registered notification to the presentity 39. The presentity 39 sends the presence information of the terminating UE 34 to the terminating AS 38. By this way, when the registration determining unit 41 determines that the terminating UE 34 is registered in the terminating IMS core network 36 according to the presence information, the video sharing requesting unit 43 sends the video sharing request to the terminating UE 34.

Figure 6:
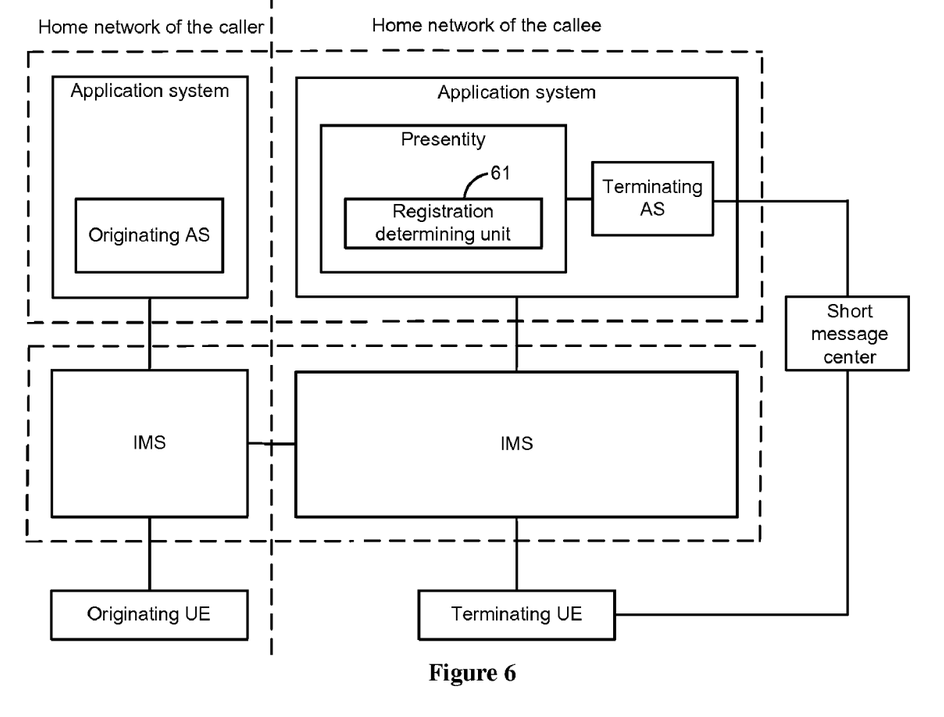
FIG. 6 shows a schematic diagram of a system for video sharing according to another embodiment of the invention.

According to an embodiment of the invention as shown in FIG. 6, the presentity 39 includes a terminal registration unit 61. The terminal registration unit 61 records the presence information of the terminating UE 34 in the IMS core network 36. According to the presence information of the terminating UE 34 in the IMS core network 36 recorded in the terminal registration unit 61, the registration determining unit 41 of FIG. 4 determines whether the terminating UE 34 is registered in the terminating IMS core network 36.

Figure 7:
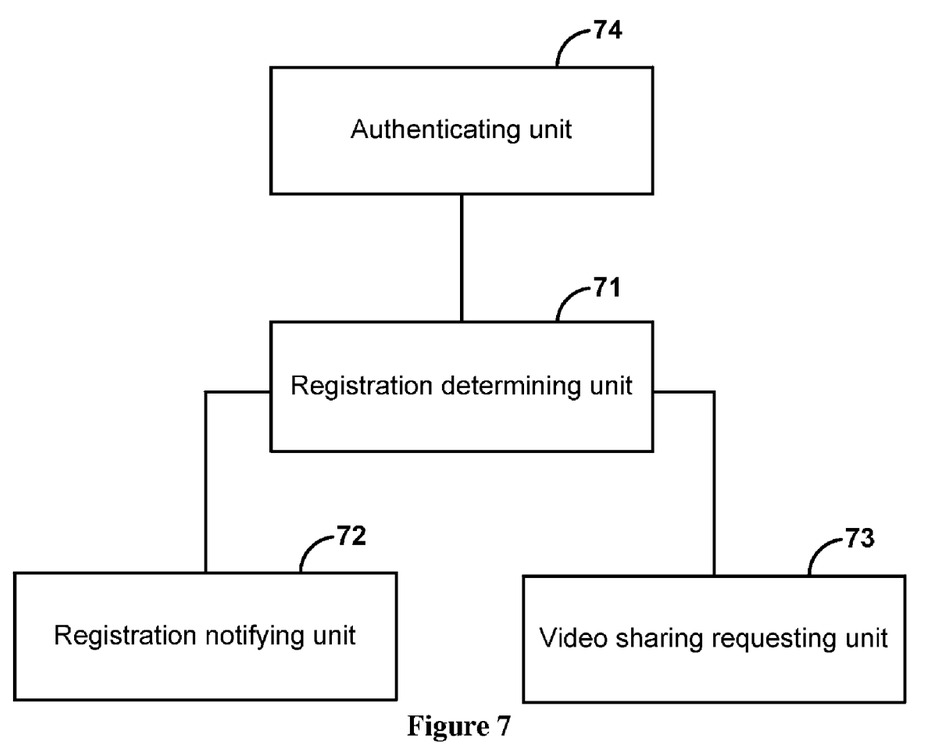
FIG. 7 shows a schematic diagram of an application server according to an embodiment of the invention.

As shown in FIG. 7, the AS 38 according to one embodiment of the invention includes a registration determining unit 71, a registration notifying unit 72 and a video sharing requesting unit 73.

The registration determining unit 71 determines whether the terminating UE 34 is registered in the terminating IMS core network 36 after the URI of callee contained in the video sharing request is authenticated.

In response to the registration determining unit 71 determining that the terminating UE 34 is not IMS core network registered, the registration notifying unit 72 obtains the MSISDN of the terminating UE 34 from the terminating core network 36, and sends a notification to the terminating UE 34 according to the MSISDN, requesting the terminating UE 34 to register with the terminating IMS core network.

The video sharing requesting unit 73 sends the video sharing request to the terminating UE 34 after the registration determining unit 71 determines that the terminating UE 34 is IMS core network registered.

The AS 38 further includes an authenticating unit 74. The authenticating unit 74 is configured to authenticate the URI of callee contained in the video sharing request and to send the authentication result to the registration determining unit 71.

Figure 8:
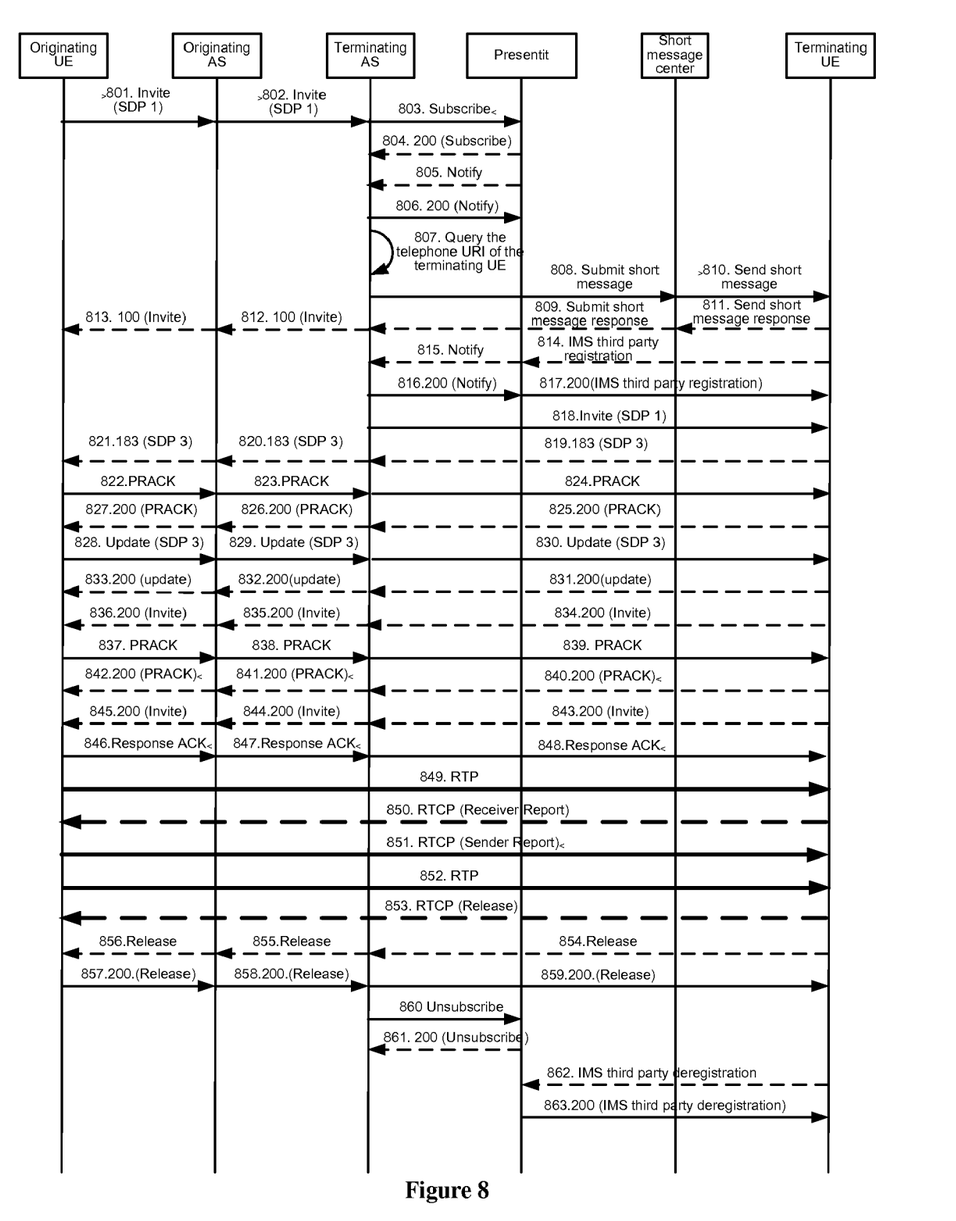
FIG. 8 shows a signaling flow for a method for video sharing according to one embodiment of the invention.

According to an embodiment of the invention as shown in FIG. 8, the signaling flow for video sharing includes the following steps:

Steps 801-802: An originating UE sends a video sharing request to a terminating AS via a originating AS.

Steps 803-806: The terminating AS queries the presence information of the terminating UE.

Specifically, the process includes the following steps: the terminating AS sends a SUBSCRIBE request to a presentity to get the presence information of the terminating UE; the presentity sends a SUBSCRIBE ACK to the terminating AS; the presentity sends the presence information to the terminating AS; the terminating AS sends a receipt acknowledgement to the presentity; the terminating AS determines whether the terminating UE is IMS core network registered; if the terminating UE is IMS core network registered, the process proceeds to step 818, otherwise it proceeds to step 807.

Step 807: The terminating AS queries the MSISDN of the terminating UE.

Specifically, the process includes the following steps: the terminating AS queries the MSISDN of the terminating UE at the local or home subscriber server (HSS) or E.164 number entity (ENUM) according to the SIP URI of the terminating UE.

Steps 808-813: The terminating AS sends a short message to the terminating UE via the short message center.

Specifically, the process includes the following steps: the terminating AS sends a short message via the short message center; the short message center sends an acknowledgement to the terminating AS; the short message center sends the short message to the terminating UE; the terminating UE sends an acknowledgement to the short message center; the terminating AS sends a provisional response to the originating UE via the originating AS.

Steps 814-817: The terminating UE performs third party registration in the IMS core network.

Specifically, the process includes the following steps: the terminating UE sends a third party registration request to the terminating IMS core network after receiving the short message; the IMS core network receives the third party registration request and transfers it to the presentity; the presentity sends a registration acknowledgement to the IMS core network; the presentity sends a callee registered notification to the terminating AS; the terminating AS sends a callee registered response to the terminating UE via the presentity.

Step 818: The terminating AS forwards the video sharing notification to the terminating UE.

Steps 819-848: The originating UE and the terminating UE establish provisional communication.

Specifically, the process includes the following steps: the terminating UE sends an acknowledgement to the originating UE via the terminating AS and the originating AS; the originating UE sends an UPDATE to the terminating UE via the originating AS and the terminating AS; the terminating UE sends an ALERT to the originating UE via the terminating AS and the originating AS; the originating UE sends a PRACK to the terminating UE via the originating AS and the terminating AS; the terminating UE sends an acknowledgement to the originating UE via the terminating AS and the originating AS; the terminating UE sends a video sharing request acknowledgement to the originating UE via the terminating AS and the originating AS; the originating UE sends a response acknowledgement to the terminating UE via the originating AS and the terminating AS.

Steps 849-852: The originating UE and the terminating UE establish an RTP link and share video information over the link.

Specifically, the process includes: the originating UE establishes an RTP link with the terminating UE; the terminating UE sends a receiver report to the originating UE; the originating UE sends a sender report to the terminating UE; the originating UE shares video information with the terminating UE over the RTP link.

Steps 853-859: The terminating UE disconnects, the originating and terminating UEs release the communication link, and the video sharing ends.

Specifically, the process includes: the terminating UE sends an RTP LINK RELEASE message to the originating UE; the terminating UE sends a RELEASE message to the originating UE via the terminating AS and the originating AS; the originating UE sends a RELEASE ACK to the terminating UE via the originating AS and the terminating AS.

Steps 860-863: The presentity and the IMS core network deregister the terminating UE.

Specifically, the process includes: the terminating AS sends an UNSUBSCRIBE request to the presentity; the presentity sends an UNSUBSCRIBE ACK to the terminating AS; the IMS core network sends a DEREGISTER request to the presentity; the presentity sends a DEREGISTER ACK to the IMS core network.

Figure 9:
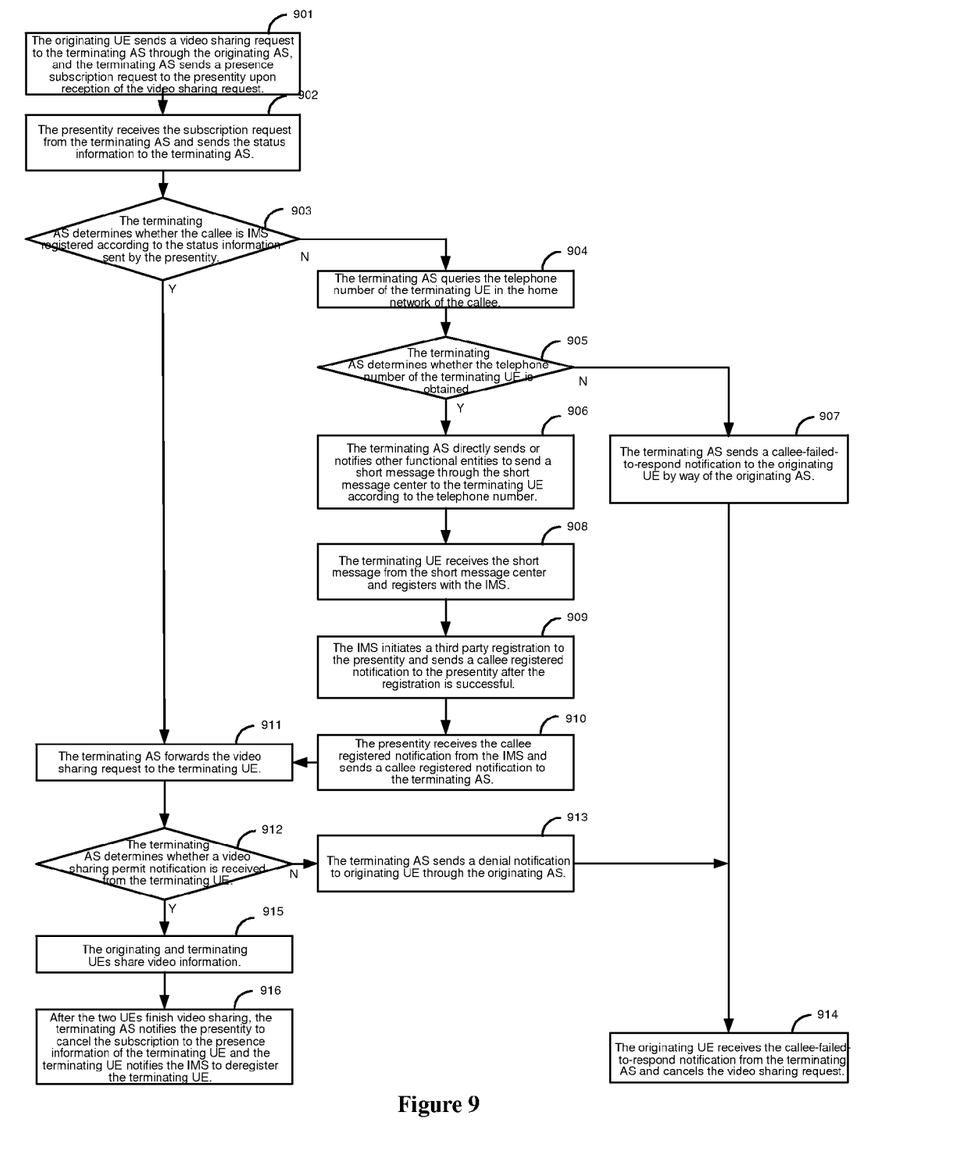
FIG. 9 shows a flow chart illustrating a method for video sharing according to one embodiment of the invention.

According to an embodiment of the invention as shown in FIG. 9, the method for video sharing includes the following steps:

Step 901: The originating UE sends a video sharing request to the terminating AS via the originating AS, and the terminating AS sends a presence subscription request to the presentity upon reception of the video sharing request.

Step 902: The presentity receives the presence subscription request from the terminating AS and sends the presence information to the terminating AS.

Step 903: The terminating AS determines whether the terminating UE is IMS core network registered according to the presence information sent by the presentity and if the terminating UE is IMS core network registered, proceed to step 911, otherwise proceed to step 904.

Step 904: The terminating AS queries the MSISDN of the terminating UE in the home network of the terminating UE.

Step 905: The terminating AS determines whether the telephone number of the terminating UE is obtained and proceed to step 906 if it is obtained, otherwise proceed to step 907.

Step 906: The terminating AS directly sends or notifies other functional entities to send a short message via the short message center to the terminating UE according to the telephone number, and proceed to step 908.

Step 907: The terminating AS sends a callee-failed-to-respond notification to the originating UE via the originating AS, and proceed to step 914.

Step 908: The terminating UE receives the short message from the short message center and registers with the IMS core network.

Step 909: The IMS core network initiates a third party registration to the presentity and sends a callee registered notification to the presentity after the registration is successful.

Step 910: The presentity receives the callee registered notification from the IMS core network and sends the callee registered notification to the terminating AS.

Step 911: The terminating AS forwards the video sharing request to the terminating UE.

Step 912: The terminating AS determines whether a video sharing permit notification is received from the terminating UE, and proceed to step 915 if it is received, otherwise proceed to step 913.

Step 913: The terminating AS sends a denial notification to the originating UE via the originating AS.

Step 914: The originating UE receives the callee-failed-to-respond notification from the originating AS and cancels the video sharing request.

Step 915: The originating UE shares video information with the terminating UE.

Step 916: After the originating UE and the terminating UE finish video sharing, the terminating AS notifies the presentity to cancel the subscription to the presence information of the terminating UE and the terminating UE notifies the IMS core network to deregister the terminating UE; the process ends.

After the originating UE sends the video sharing request to the terminating AS via the originating AS, the terminating AS needs to determine whether the terminating UE is IMS core network registered by sending a SUBSCRIBE request to the presentity in the home network of the terminating UE to get the presence information of the terminating UE. Because the presentity records the registration status of the terminating UE in the IMS core network, after receiving the SUBSCRIBE request from the terminating AS, it sends a notification containing the presence information of the terminating UE to the terminating AS.

After receiving the presence information of the terminating UE from the presentity, the terminating AS determines whether the terminating UE is IMS core network registered. If the terminating AS determines that the terminating UE is IMS core network registered, it forwards the video sharing request to the terminating UE. After the terminating UE receives the video sharing request, the two UEs perform media negotiation and resource reservation and share video information over the RTP link set up between them. If the terminating AS determines that the terminating UE is not IMS core network registered, the terminating AS queries the MSISDN of the terminating UE in the local database, HSS or ENUM entity of the home network of the terminating UE. If the terminating AS determines that the MSISDN of the terminating UE is obtained, it obtains the telephone number of the terminating UE from the MSISDN. The terminating AS may directly send or notify other functional entities in the home networks of the caller or the callee to send a short message to the terminating UE via the short message center. The terminating UE registers with the IMS core network upon reception of the short message. If the terminating AS determines that the MSISDN of the terminating UE is not obtained, it sends a response indicating that the terminating UE is inaccessible. The originating UE cancels the video sharing request upon reception of the response.

Upon the terminating UE is IMS core network registered, the IMS core network sends a third party registration request to the presentity. The presentity receives the third party registration request and sends a callee registered notification to the terminating AS; or the terminating UE sends the callee registered notification to the terminating AS directly. The callee registered notification indicates the terminating UE is registered. After the terminating AS receives the callee registered notification from the presentity or the terminating UE, it forwards the video sharing request from the originating UE to the terminating UE. After the terminating UE receives the request, it performs media negotiation and resource reservation with the originating UE and the two UEs share video information over the RTP link set up between them.

After the two UEs finish video sharing, the terminating AS notifies the presentity to cancel the subscription to the presence information of the terminating UE and the terminating UE notifies the IMS core network to deregister the terminating UE.

In the case that no presentity exists in the mobile network, the AS does not obtain the presence information of the terminating UE from a presentity. Upon the originating UE sends a video sharing request via the originating AS and the terminating AS, the terminating AS determines whether the terminating UE is IMS core network registered according to the terminating UE offline indication from the IMS core network. If the terminating UE is IMS core network registered, the originating UE shares video information with the terminating UE. If the terminating UE is not IMS core network registered, the AS directly sends or notifies other functional entities in the system to send a short message to the terminating UE via the short message center. The terminating UE registers with the IMS core network upon reception of the short message. The two UEs share video information after the terminating UE is successfully registered.

With the method, system and apparatus in the embodiments of the invention, for UEs to share video information, it is unnecessary to set up a CS voice connection in advance. This is favorable for the implementation of video sharing. Voice connection and IMS core network registration are unnecessary for each video sharing session, saving GPRS resources. No matter whether the UE is IMS core network registered, it is only needed that the AS notifies the terminating UE to register with the terminating IMS core network and after the terminating UE is IMS core network registered, the UEs can share video information, without establishing a CS voice connection.

It is apparent that those skilled in the art can make various modifications and variations to the invention as described herein without departing from the spirit and scope of the invention. The invention is intended to cover these modifications and variations provided that they fall in the scope of protection defined by the following claims. It is further within the scope of the invention to include all foreseeable equivalents to each of the elements of the following claims.

What is claimed is:

1. A method for video sharing, comprising the steps of:

receiving, by an application server AS, a video sharing request containing a uniform resource identifier URI of a terminating UE;

notifying, by the AS, the terminating UE to register if the AS determines that the terminating UE is not IMS core network registered after receiving the video sharing request containing the URI of the terminating UE; and providing, by the AS, a video sharing service for an originating UE and the terminating UE, after the terminating UE activates a GPRS connection and registers with an IMS core network, wherein the AS comprises a terminating AS, and the process of receiving a video sharing request comprises the step of:

receiving, by the terminating AS, the video sharing request containing the URI of the terminating UE from a terminating IP multimedia subsystem (IMS) core network; and wherein the process of notifying the terminating UE to register comprises the steps of:

obtaining, by the terminating AS, a MSISDN of the terminating UE from a home network of the terminating UE according to the URI of the terminating UE; and sending, by the terminating AS, a short message containing a service identifier to the terminating UE via a short message center according to the MSISDN of the terminating UE, to notify the terminating UE to register with the terminating IMS core network.

2. The method of claim 1, wherein the process of receiving a video sharing request from the terminating IMS core network comprises the step of:
receiving, by the AS, the video sharing request containing the URI of the terminating UE from the terminating IMS core network after determining that the originating UE is authenticated by a originating AS.

3. The method of claim 1, wherein the terminating AS obtains the MSISDN of the terminating UE by querying a local database of the home network of the terminating UE according to the URI of the terminating UE, or by obtaining the MSISDN of the terminating UE by querying the HSS or E. 164 number entity in the terminating IMS core network.

4. The method of claim 1, wherein when the terminating AS determines that the terminating UE is not IMS core network registered and the terminating UE fails to be notified to register, further comprising the step of: notifying, by the terminating AS, the originating UE via the terminating IMS core network and the originating IMS core network that the terminating UE is inaccessible.

5. The method of claim 1, further comprising the step of:
receiving, by the terminating AS, presence information showing that the terminating UE is registered in the terminating IMS core network.

6. The method of claim 5, wherein the process of receiving presence information comprises the steps of:
receiving, by the terminating AS, presence information from a presentity after the presentity receives a third party registration notification from the terminating IMS core network; or
receiving, by the terminating AS, presence information from the terminating IMS core network after the terminating UE successfully registers with the terminating IMS core network.

7. The method of claim 1, wherein the process of providing a video sharing service for an original UE and the terminating UE comprises the steps of:
forwarding, by the terminating AS, the video sharing request sent by the originating UE to the terminating UE; and
determining, by the terminating AS, whether a video sharing permit notification is received from the terminating UE and if so, sending a video sharing permit notification to the originating UE, which shares video information with the terminating UE; or else sending a video sharing denial notification to the originating UE.

8. An application server, AS, comprising:
a registration determining unit, adapted to determine whether a terminating UE is IMS core network registered after a uniform resource identifier URI of the terminating UE contained in a video sharing request is authenticated;
a registration notifying unit, adapted to notify the terminating UE to register with the IMS core network after the terminating UE is determined to be not IMS core network registered; and
a video sharing requesting unit, adapted to send a video sharing request to the terminating UE after the terminating UE is determined to be IMS core network registered,
wherein the AS comprises a terminating AS, and the terminating AS is further adapted to:
receive the video sharing request containing the URI of the terminating UE from a terminating IP multimedia subsystem (IMS) core network;
obtain a MSISDN of the terminating UE from a home network of the terminating UE according to the URI of the terminating UE; and
send a short message containing a service identifier to the terminating UE via a short message center according to the MSISDN of the terminating UE, to notify the terminating UE to register with the terminating IMS core network.

9. The AS of claim 8, further comprising:
an authenticating unit, adapted to authenticate the URI of terminating UE contained in the video sharing request and send an authentication result to the registration determining unit.

10. The AS of claim 8, wherein the registration notifying unit notifies the terminating UE by causing a short message containing a service identifier to be sent to the terminating UE.

11. A system for video sharing, comprising:
at least one IMS core network, adapted to forward messages exchanged between a UE and an AS and provide a video sharing service after the originating UE and the terminating UE are registered;
at least one AS, adapted to receive a video sharing request containing a uniform resource identifier URI of terminating UE from the originating UE and notify the terminating UE to register if it determines that the terminating UE is not IMS core network registered;
an originating UE, adapted to send the video sharing request containing the URI of terminating UE to the AS; and
a terminating UE, adapted to activate a GPRS connection and register with the IMS core network if it is not IMS core network registered after receiving the video sharing request,
wherein the AS comprises a terminating AS, and the terminating AS is further adapted to:
receive the video sharing request containing the URI of the terminating UE from a terminating IP multimedia subsystem (IMS) core network;
obtain a MSISDN of the terminating UE from a home network of the terminating UE according to the URI of the terminating UE; and
send a short message containing a service identifier to the terminating UE via a short message center according to the MSISDN of the terminating UE, to notify the terminating UE to register with the terminating IMS core network.

12. The system of claim 11, wherein the AS further comprises an originating AS and the IMS core network comprises an originating IMS core network and a terminating IMS core network:
the originating IMS core network, adapted to receive the video sharing request from the originating UE and forward the request to the originating AS; and to send the video sharing request to the terminating IMS core network after the originating AS authenticates the URI of terminating UE contained in the video sharing request;
the originating AS, adapted to send the video sharing request to the originating IMS core network after the URI of terminating UE contained in the video sharing request is authenticated;
the terminating IMS core network, adapted to send the video sharing request to the terminating AS; to send the video sharing request to the terminating UE after the terminating AS authenticates the URI of terminating UE contained in the video sharing request; and to register the terminating UE according to the registration request received from the terminating UE;
the terminating AS, adapted to send a notification to the terminating UE if the terminating UE is not registered in the terminating IMS core network, notifying the terminating UE to register with the terminating IMS core network, after the URI of terminating UE contained in the video sharing request is authenticated; and to send the video sharing request to the terminating UE after determining that the terminating UE is registered in the terminating IMS core network.

13. The system according to claim 11, further comprising:
a presentity, adapted to store and provide the registration determining unit with presence information of the terminating UE in a terminating IMS core network.

14. The system according to claim 11, further comprising a short message center, adapted to send a short message that contains a service identifier to the terminating UE for forwarding the notification of IMS core network registration from a registration notifying unit to the terminating UE.

15. A system for video sharing, comprising an application server AS, wherein the AS is adapted to:
receive a video sharing request containing a uniform resource identifier URI of a terminating UE;
notify a terminating UE to register if the AS determines that the terminating UE is not IMS core network registered after receiving the video sharing request containing the URI of the terminating UE; and
provide a video sharing service for an originating UE and the terminating UE, after the terminating UE activates its GPRS connection and registers with an IMS core network,
wherein the AS comprises a terminating AS, and the terminating AS is further adapted to:
receive the video sharing request containing the URI of the terminating UE from a terminating IP multimedia subsystem (IMS) core network;
obtain a MSISDN of the terminating UE from a home network of the terminating UE according to the URI of the terminating UE; and
send a short message containing a service identifier to the terminating UE via a short message center according to the MSISDN of the terminating UE, to notify the terminating UE to register with the terminating IMS core network.

16. The method of claim 15, wherein the terminating AS is further adapted to:
forward the video sharing request sent by the originating UE to the terminating UE; and
determine whether a video sharing permit notification is received from the terminating UE and if so, send a video sharing permit notification to the originating UE, which shares video information with the terminating UE; or else send a video sharing denial notification to the originating UE.

* * * * *